Patented Apr. 4, 1950

2,502,884

UNITED STATES PATENT OFFICE 2,502,884

COLOR STABILIZED ROSIN SIZE

Edward N. Poor, Stamford, and Chester G. Landes, New Canaan, Conn., assignors to American Cyanamid Company, New York, N. Y., a corporation of Maine No Drawing. Application May 12, 1948, Serial No. 26,708

5 Claims. (Cl. 106—218)

This invention relates to rosin size compositions, and more particularly to paper sizing compositions having improved color stability, and to methods of preparing the same.

Rosin sizes are usually produced by saponifying rosin with alkalies. In preparing liquid rosin sizes, the rosin is usually heated with an aqueous solution of sodium or potassium carbonate, usually employing about 9–16% of sodium carbonate based on the weight of the rosin, at about 190–212° F. for about 6 hours. In the preparation of dry rosin size the rosin is frequently reacted with about 9–12% of sodium or potassium hydroxide, in the form of a relatively concentrated aqueous solution, which produces the dry size directly. Ammonium hydroxide has also been used as a saponifying agent. Dry rosin size is also produced by subjecting the liquid size, prepared as described above, to evaporation on a drum dryer or by spray drying.

In order to avoid darkening or discoloration of the sized paper it is customary to employ a rosin which is light in color. Such light-colored rosins, known in the trade as pale rosins, are those of grade I, K, M, N, WG, WW and X, these designations corresponding to official rosin standards that have been established by the United States Department of Agriculture. Purified rosins of this type are prepared from crude or FF rosin by solvent extraction and purification methods.

Although light-colored rosin sizes are obtained by the saponification of the lighter colored or pale classes of rosin, these sizes darken during the life of paper sized therewith. It is to this discoloration or darkening of paper sized with rosin sizes initially prepared from pale or light-colored solvent-refined rosins that the present invention is particularly directed. The color-stabilized sizes may also be used in the manufacture of industrial and household soap products, in which stability against darkening is important.

The principal object of the present invention is to improve the color stability of rosin sizes so that paper and other fibrous cellulosic materials sized therewith will have a reduced tendency to discolor or darken with heat or with time. A further object is the pretreatment of solvent-refined rosin with a class of stabilizers which will inhibit to a considerable extent the darkening of sized paper prepared therefrom, but which will produce little or no discoloration of the paper. A still further object is the provision of color stabilizers for rosin and rosin sizes which are relatively cheap and which are obtainable commercially in large quantities.

We have found that the dark-colored material known commercially as tall oil pitch can be converted into an excellent color stabilizer for pale wood rosin sizes by a heating treatment. Accordingly, our invention consists essentially in the incorporation into pale or solvent-extracted wood or gum rosins, or mixtures, thereof, of heat-treated tall oil pitch in amounts sufficient to exert a color stabilizing action on sizes prepared therefrom.

Tall oil pitch is a dark-colored liquid, semisolid or solid material that is obtained as a residue in the refining of tall oil. As is well known, tall oil itself is a by-product of the pulping of pine wood by the sulfate or soda process. In this process a soap, known as black liquor soap, separates from the black liquor obtained from the digesters in which the pine wood is delignified. Upon acidification with acids there is obtained a mixture of about 30–35% of resin acids, principally abietic acid and about 55–65% of fatty acids, most of which are unsaturated acids of 16–18 carbon atoms, together with some 5–10% of unsaponifiables. This mixture, known as crude tall oil, is purified by filtration or by steam distillation under a vacuum, or both. The residue from the distillation is known commercially as tall oil pitch. A typical product of this class has the following characteristics:

| | |
|---|---|
| Acid No. | 60–75 |
| Sap. No. | 90–110 |
| Rosin acids per cent | 24–32 |
| Fatty acids do | 35–50 |
| Sterols do | 22–32 |

As is stated above, we have found that tall oil pitch can be converted into an excellent color stabilizer for rosin sizes by subjecting it to a heat treatment. This heat treatment can be carried out simply by heating the tall oil pitch in an oxygen-free atmosphere to a temperature within the range of about 250–325° C. for about 1 hour to 3 hours; however, we find that even better results are obtained by admixing the unheated tall oil pitch with the rosin to be used in preparing the size and subjecting the mixture to the same heat treatment for the same period of time.

The quality of tall oil pitch to be admixed with the pale rosin will depend to some extent on the particular tall oil pitch and also on the degree of color stability desired in the finished size. A definite improvement in stability is noted when as little as 1% of the tall oil pitch is used, based on the weight of the mixture, while as much as 10–15% may be employed if desired. It will be understood that the tall oil pitches obtained commercially are not all of uniform composition, and therefore it may be desirable to use larger quantities of pitch from one source than from another.

It would ordinarily be expected that the color of paper sized with pale rosin sizes would be materially darkened by adding to these sizes the necessary quantities of dark-colored tall oil pitch. We have found, however, as an important feature of our invention, that such a darkening is almost completely avoided by subjecting the mixture of rosin and tall oil pitch to a heat treatment of 250-325° C. for 1 to 3 hours, as described above. This treatment is preferably carried out by heating the mixture in an atmosphere of nitrogen or carbon dioxide and nitrogen or steam in order to avoid the presence of oxygen, the preferred treatment being at 300° C. for about 2 hours. Very similar results have been obtained by heating the rosin and the tall oil pitch separately under the same conditions; however, it is usually more convenient to heat the mixture.

The invention will be further illustrated by the following specific examples. It should be understood however that although these examples may describe in detail certain of the more specific features of the invention they are also to be regarded as illustrative of the quantities and types of other materials that may be used in practicing the invention.

Example 1

A uniform mixture of 500 grams of solvent refined grade M wood rosin and 10 grams of tall oil pitch was heated for about 2 hours at 300° C. in an inert gas atmosphere.

A hot aqueous mixture consisting of 230 ml. of hot water and 65 grams of $Na_2CO_3$ was added to 500 grams of the above described heat treated rosin to obtain a dispersion containing 70% solids. This dispersion was heated on an oil bath for about 6 hours at 90° C.–100° C., the water lost by evaporation being constantly replaced.

Sulfite pulp was beaten to a Green freeness of 350-450 cc. and to the slush pulp was added 3%, based on the dry weight of the cellulose fiber, of the above described rosin size solids in the form of an aqueous emulsion containing 5% rosin size solids. The rosin size was precipitated on the cellulose fibers by the addition to the slush stock of aluminum sulfate. Thereafter sheets of paper were prepared on a British sheet machine. The paper sheets were evaluated for brightness on a General Electric Co. recording spectrophotometer at 450 millimicrons according to well-known standard procedure. The sheets were then heated in an oven at 105° C. for 16 hours and again evaluated on the spectrophotometer. The results are tabulated below at the table of Example 3.

Example 2

The procedure of Example 1 was repeated except that 25 grams of tall oil pitch were employed. Test results are tabulated in the table of Example 3.

Example 3

The procedure of Example 1 was repeated except that 50 grams of tall oil pitch were employed. Test results are tabulated in the following table:

| Example No. | Sizing Agent Used | Heat Treatment of Rosin Mixture | Initial Color per cent Reflectance at 450 mu. | Color Reversion after 16 hours at 005° C. |
|---|---|---|---|---|
| Control | 100% Grade M wood rosin | None | 78.0 | 8.4 |
| Do | 98% Grade M wood rosin and 2% Tall Oil Pitch | do | 78.3 | 7.8 |
| Example 1 | do | 2 hours at 300° C. | 79.2 | 3.7 |
| Example 2 | 95% Grade M wood rosin and 5% Tall Oil Pitch | do | 78.3 | 3.7 |
| Example 3 | 90% Grade M wood rosin and 10% Tall Oil Pitch | do | 78.6 | 4.1 |

What we claim is:

1. A light-colored rosin size of improved color stability consisting essentially of the product obtained by saponifying with about 9-16% of its weight of an alkaline alkali metal compound a mixture of 85-99% by weight of pale rosin and 15-1% of tall oil pitch heated in an oxygen-free atmosphere at 250-325° C. for about 1 to 3 hours.

2. A light-colored rosin size of improved color stability consisting essentially of the product obtained by saponifying with about 9-16% of its weight of sodium carbonate a mixture of 85-99% by weight of pale rosin and 15-1% of tall oil pitch heated in an oxygen-free atmosphere at about 300° C. for about 2 hours.

3. A method of producing a rosin size of improved color stability which comprises preparing a mixture of 85-99% by weight of pale rosin and 15-1% by weight of tall oil pitch, heating the mixture in an oxygen-free atmosphere at a temperature within the range of 250-325° C. for about 1 to 3 hours, and then saponifying the resulting rosin product with about 9-16% of its weight of an alkaline alkali metal compound.

4. A method of producing a rosin size of improved color stability which comprises preparing a mixture of 85-99% by weight of pale rosin and 15-1% by weight of tall oil pitch, heating the mixture in an oxygen-free atmosphere at about 300° C. for about 2 hours, and then saponifying the resulting rosin product with about 9-16% of its weight of an alkaline alkali metal compound.

5. A method of producing rosin size of improved color stability which comprises saponifying with about 9-16% of its weight of sodium carbonate a mixture of 85-99% by weight of pale rosin and 15-1% by weight of tall oil pitch, each ingredient of said mixture having been heated in an oxygen atmosphere at a temperature within the range of 250-325° C. for about 1 to 3 hours.

EDWARD N. POOR.
CHESTER G. LANDES.

REFERENCES CITED

The following references are of record in the file of this patent:

UNITED STATES PATENTS

| Number | Name | Date |
|---|---|---|
| 1,929,115 | Johnstone | Oct. 3, 1933 |